INVENTORS
CLAUDE A. LOFLIN
CHARLES B. MOORE

BY *Harry J. McCauley*

ATTORNEY

United States Patent Office 3,129,334
Patented Apr. 14, 1964

3,129,334
TEMPERATURE CONTROLLED RADIATION GAGE
Claude A. Loflin, Wilmington, Del., and Charles B. Moore, Parkersburg, W. Va., assignors to E. I. du Pont de Nemours and Company, Wilmington, Del., a corporation of Delaware
Filed Oct. 6, 1961, Ser. No. 143,510
2 Claims. (Cl. 250—89)

This invention relates to a temperature controlled radiation gage, and particularly to a gamma radiation gage for use in high temperature environments provided with means maintaining the detector thereof at a substantially constant predetermined low temperature.

It is sometimes necessary to measure the levels, densities or other physical properties of chemical reactants which are maintained at relatively high temperatures and pressures, which properties are a function of gamma radiation absorption. It has not hitherto been possible to use gamma radiation gages in high temperature service, because the radiation detection units are damaged by temperatures in excess of about 150° F., the accuracy of detection is reduced an intolerable amount or there is other tempearture-caused interference which affects operation adversely.

Figure 1:
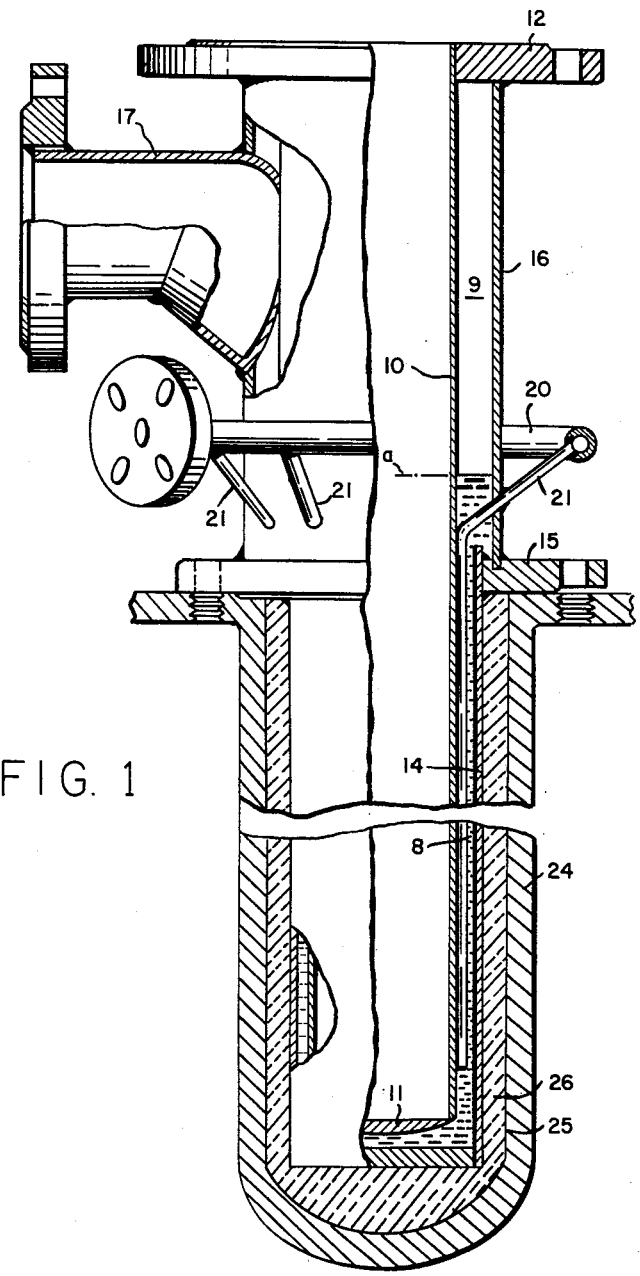
Figure 2:
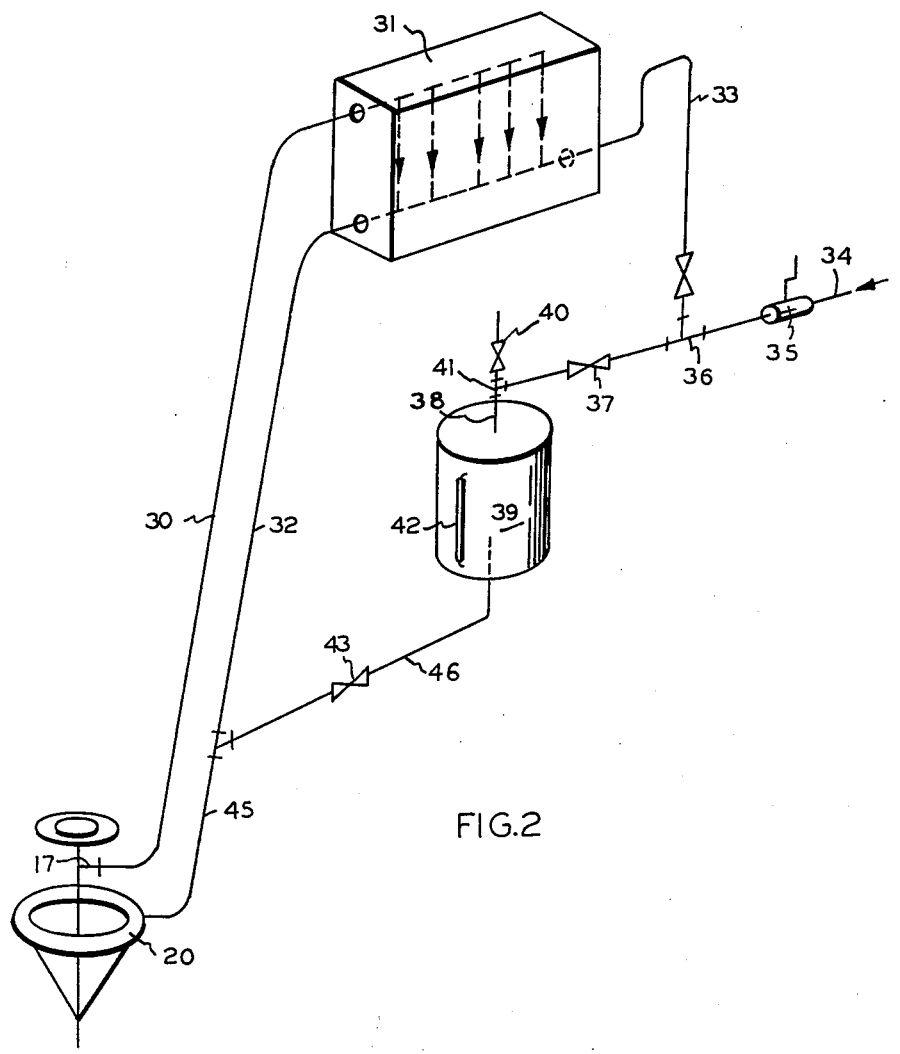

An object of this invention is to provide a temperature controlled gamma radiation gage which is adapted to use in high temperature environments. Another object of this invention is the provision of a high temperature service gamma radiation gage having the detector maintained at a predetermined low temperature by enclosure in a cooling jacket. Yet another object of this invention is the provision of a gamma radiation gage having the detector element maintained at a predetermined constant low temperature by heat transfer to, with concomitant vaporization of, a body of liquid coolant interposed between the detector and the environment in which the radiation gage is utilized. The manner in which these and other objects of this invention are obtained will become clear from the following detailed description and the drawings, in which:

FIG. 1 is a longitudinal detailed view showing, partially in section, a preferred embodiment of radiation detector holder employed in accordance with this invention, and FIG. 2 is a partially schematic perspective piping diagram of a preferred coolant recycle circuit co-operating with the holder of FIG. 1.

Generally, this invention comprises a gamma radiation gage adapted to use within an enclosure maintained at a relatively high temperature level incorporating a gamma radiation detector in line with the source but separated therefrom by a space reserved for the reception of material a condition of which it is desired to evaluate as a function of radiation absorption having a gamma radiation-permeable jacket hermetically enclosing the gamma radiation detector and defining therewith a coolant passage, and means in communication with the jacket supplying liquid coolant substantially non-absorptive of gamma radiation emitted by the source and stable under gamma irradiation to the jacket and removing vaporous coolant from the jacket.

Referring to FIG. 1, there is shown a preferred embodiment according to this invention wherein the gamma radiation gage is intended to measure the level of interface between two substantially immiscible liquid phases maintained at a pressure of about 1000 p.s.i.g. and a temperature of approximately 300° C. The heavy steel-walled vessel holding the process liquid is not detailed, because not pertinent to the invention; however, it measured 9′-0″ in dia. was 16′ tall and was provided with a conical bottom section. The specific arrangement of source with respect to detector is likewise not pertinent to this invention and is therefore not shown in the drawings; however, the source in this instance consisted of a multiplicity of gamma radiation-emitting slugs spaced one from another in vertical array within a metal tube approximately 54½″ long disposed coparallel with the axis of the process vessel. The actual arrangement utilized three separate spaced sources, of which the lowermost and uppermost were each 150 milli-curie Cs 137 slugs, whereas the middle source was a 500 milli-curie slug of the same material, spaced from the other two by equal distance of 24″. The gamma radiation output of individual ones of these slug sources was adapted to impinge on pairs of conventional radiation detectors (in this instance, Ohmart cells) which were arranged in a vertical stack spaced about 36″ measured in a horizontal plane from the radiation source.

The radiation detector holder consisted of a 3½″ O.D., 0.065″ thick steel retaining tube 10 approximately 11′-6″ long, closed off at the bottom at 11 and provided at its end outboard of the vessel with a flange 12. Tube 10 was telescopically mounted over all except the upper 12″ of its length within a closed end, 0.120″ thick steel tube 14 approximately 10′-7″ long x 4¼″ O.D. defining therewith an open circumferential passage 8 for coolant measuring approximately ¼″ radially, with an average end-to-end space for coolant in the region of the tube ends of about ½″. Tube 14 was welded at its upper end to flange 15, and the coolant jacket completed by a tubular metal section 16 of somewhat greater diameter than 14, providing with tube 10 an open circumferential enlargement 9 for coolant measuring 12″ high and ⅝″ radially, which section was weld-joined at the top to the underside of flange 12. Section 16 was provided with a flanged 3″ nozzle 17 vaporous coolant exhaust opening therefrom at an angle of about 90°, with lower end located about one-third of the full length up from the lower end of section 16. A liquid coolant supply manifold consisting of a tubular ring 20 provided with eight ¼″ diameter equiangularly spaced downcomers 21 communicating internally thereof at angles of about 45° was mounted on the outside of tubular section 16, with the downcomers entering the jacket interspace near the lower end of section 16 and opening at a common level about 1″ from the inside closed end of tube 14. The radiation detector holder assembly was mounted within a 6.625″ O.D., 5.189″ I.D., 0.718″ wall thickness closed steel tubular well 24 integral with the process vessel by bolt attachment through flange 15, the interspace 25 being filled with 15/32″ thickness granular type thermal insulation 26, such as magnesia or the like. The upper end of tube 10 was closed off with a sealing plate (not shown) bolted to flange 12 when the detector stack was made up by insertion of individual detector units, alternated with appropriate length spacers where necessary, within the bore of tube 10.

Where it is practicable to balance the heat removal from the cooling jacket with external condensation and recycle of the condensate to the cooling jacket, a relatively simple coolant handling system can be employed which dispenses entirely with pumps and other power-driven apparatus and relies exclusively on gravity return of the coolant. Such a system is shown somewhat schematically in FIG. 2, and comprises a closed piping circuit which is connected into nozzle 17 by vapor removal line 30 and into manifold 20 by liquid coolant supply line 45.

The coolant vapor is condensed within a conventional condenser 31, which is preferably a finned tube air-cooled type mounted in a suitably elevated location, permitting condensate withdrawal by gravity flow. Conveniently, liquid coolant is removed from condenser 31 via a direct return line 32 discharging through line 45 into ring manifold 20, with any excess escaping through a valved pressure-equalizing leg 33 running to storage. It is often necessary to maintain superatmospheric pressures within the system in order, by increase of the absolute pressure applied to the coolant, to elevate the boiling point of the coolant to a somewhat higher temperature than would otherwise be necessary due to the relatively high existing temperature of the cooling air. Thus, in some southern locations atmospheric air can, on very warm days, have temperatures well in excess of 100° F. and, to maintain the temperature differential necessary to produce condensation at the required rate in order to remove heat damaging to the radiation detectors, it can become necessary to at least temporarily elevate the boiling level of coolant in the system. This is preferably effected by pressurizing the system with inert gas (typically, dry nitrogen or air) supplied to the coolant piping loop under an appropriate absolute pressure (typically, 20.0 p.s.i.a.) via line 34 provided with an adjustable absolute pressure regulator 35. The output from regulator 35 is introduced into the coolant loop at T-connection 36, the discharge port of which is connected by valve 37 to line 38 discharging into condensate storage tank 39. This tank is provided at the top with a pressure relief valve 40 connected in at the inlet T-connection 41, and with a gage glass 42. The coolant recycle circuit to line 45 is completed through the line 46, provided with valve 43.

It is obviously possible to vary widely the arrangement of the coolant cycling loop and, in situations where the elevations do not permit gravity return of the coolant, small pumps can be provided for both coolant circulation and also for pressurizing the system to obtain a predetermined boiling point elevation.

There is also a relatively wide latitude in the choice of coolants according to this invention; however, the fluorinated hydrocarbons marketed under the registered trade-name of the "Freons" are particularly desirable, since they are relatively inert chemically as well as under gamma irradiation in the intensities employed in gamma-ray gaging. Moreover, these substances possess relatively large latent heats of vaporization and boiling points at atmospheric pressure which are interspersed throughout the useful range of about 21° F. to about 199° F. Finally, these substances are relatively non-absorptive of gamma radiation and thus do not reduce the accuracy of gaging.

The boiling points of typical liquid phase fluorinated hydrocarbon compounds in the temperature range of interest (and at atmospheric pressure) are as follows:

| | |
|---|---|
| $C_4F_8$ (cyclic) | 21.1° F. (−6° C.). |
| $CClF_2CClF_2$ | 38.4° F. (3.6° C.). |
| $CHCl_2F$ | 48.1° F. (8.9° C.). |
| $CCl_3F$ | 74.8° F. (23.8° C.). |
| $CBrF_2CBrF_2$ | 117.5° F. (47.5° C.). |
| $CCl_2FCClF_2$ | 117.6° F. (47.6° C.). |
| $CCl_2FCCl_2F$ | 199° F. (92.8° C.). |

In general, substituted ethanes having the free valence bonds of the individual carbon atoms saturated with fluorine plus one other halogen element from the group consisting of chlorine and bromine are preferred coolant media in the practice of this invention.

In operation, the detector retaining tube 10 provided with its integral cooling jacket is assembled within well 24 and coolant is then circulated through the apparatus prior to introduction of the hot reactant charge to the vessel gaged. Thereafter, the temperature of coolant in the jacket is appraised by thermocouple, or in other convenient manner, and the pressure of gas elevating the boiling point adjusted until the equilibrium temperature of the coolant is brought to the desired steady level at which the gage detector is to be maintained. The cooling apparatus then requires no further attention and continues in automatic operation in the absence of a leak or other breakdown, which is usually signalled in advance by a gradual temperature rise, so that appropriate corrective action can be taken early enough to avoid damage to the detector elements, as by their timely removal from the vessel well, resort to emergency cooling measures or in other manner. In the apparatus described in detail as example herein, where the environmental temperature of the reactant vessel was 300° C., the substance $CCl_2FCClF_2$ boiling at 117.6° F. under atmospheric pressure was employed as the coolant. The equilibrium liquid level of coolant was carried at level a, FIG. 1, a distance of approximately 2" up into section 16, so that a reservoir of liquid coolant weighing about 50 lbs. was maintained in the jacket at all times. This particular installation made it advisable to elevate the boiling point of the coolant to approximately 135° F. in order to effect the necessary cooling with the atmospheric air available, and this was accomplished by maintaining a substantially constant gas pressure of about 20.0 p.s.i.a. on the coolant loop. The pressurizing gas employed was clean dry air, which proved sufficiently inert in service to cause no deterioration of the particular coolant employed.

It is advantageous with some fluorinated coolants to remove moisture as well as products of degradation progressively as the contamination occurs, and this is conveniently accomplished by interposing conventional silica gel or alumina gel adsorbers in the coolant circuit in the same manner as practiced in refrigeration technology. Molecular sieves have also proved useful as continuous cleaning adjuncts.

From the foregoing, it will be understood that this invention is subject to relatively wide modification without departure from its essential spirit, and it is therefore intended to be limited only within the scope of the appended claims.

What is claimed is:

1. In a gamma radiation gage adapted to use within an enclosure maintained at a relatively high temperature level, a gamma radiation source provided with a gamma radiation detector in line with said source but separated therefrom by a space reserved for the reception of material a condition of which it is desired to evaluate as a function of radiation absorption, a gamma radiation-permeable jacket hermetically enclosing said gamma radiation detector and defining therewith a cooling reservoir of a preselected capacity such as to absorb heat transmitted to said detector from said enclosure as latent heat of vaporization of a liquid coolant supplied to said cooling reservoir, said liquid coolant being a saturated hydrocarbon containing up to two carbon atoms having free valence bonds substantially completely saturated wtih fluorine plus one other halogen element from the group consisting of chlorine and bromine, said coolant being substantially non-absorptive of gamma radiation emitted by said source and stable under gamma irradiation, and coolant condensing means in communication with said cooling reservoir receiving vaporized coolant and recycling condensed coolant to said reservoir.

2. A gamma radiation gage according to claim 1 wherein said liquid coolant is a substituted ethane saturated with fluorine plus one other halogen element from the group consisting of chlorine and bromine, said coolant being substantially non-absorptive of gamma radiation emitted by said source and stable under gamma irradiation.

References Cited in the file of this patent

UNITED STATES PATENTS

| | | |
|---|---|---|
| 1,992,335 | Tietig | Feb. 26, 1935 |
| 2,119,091 | Atkinson et al. | May 31, 1938 |
| 2,313,087 | Parr et al. | Mar. 9, 1943 |
| 2,713,124 | Graham | July 12, 1955 |
| 2,782,318 | Herzog | Feb. 19, 1957 |
| 2,862,106 | Scherbatskoy | Nov. 25, 1958 |
| 2,949,534 | Youmans | Aug. 16, 1960 |